Fig. 7a
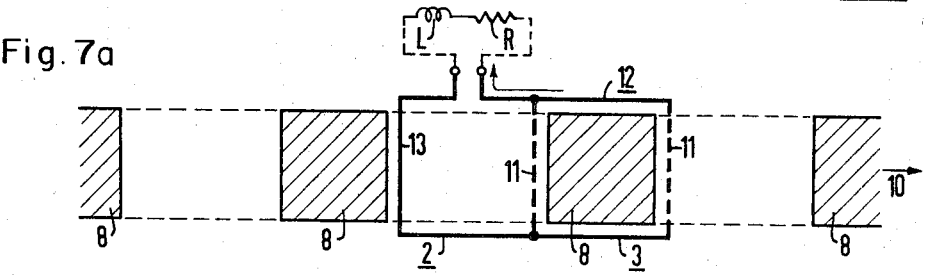
Fig. 7b
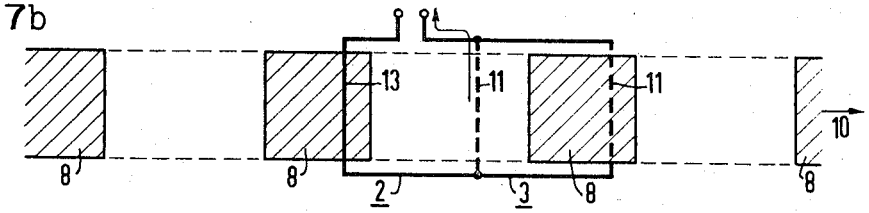
Fig. 7c
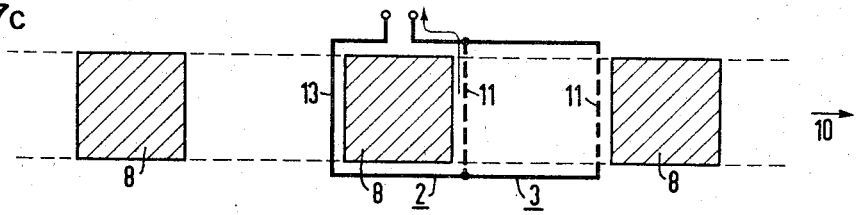
Fig. 7d
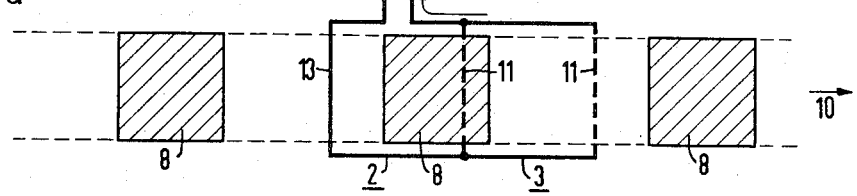
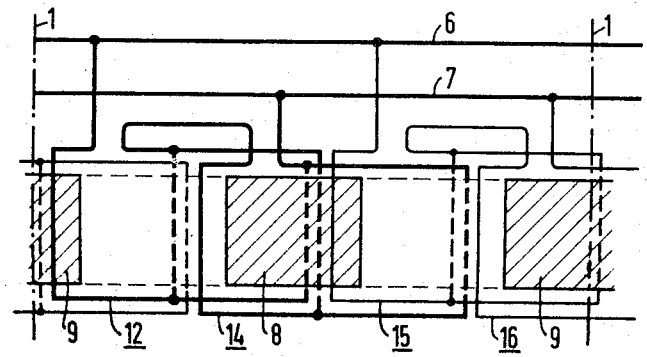
Fig. 8

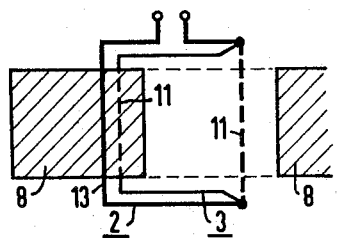
Fig. 9
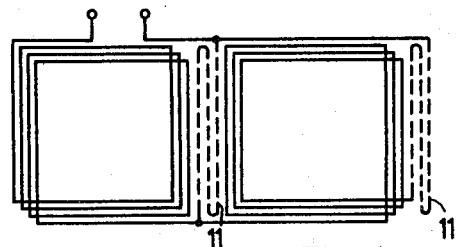
Fig. 10
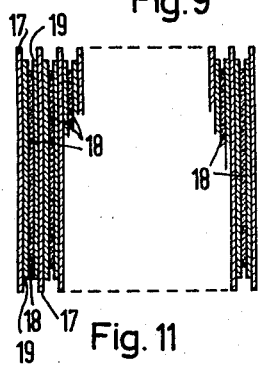
Fig. 11
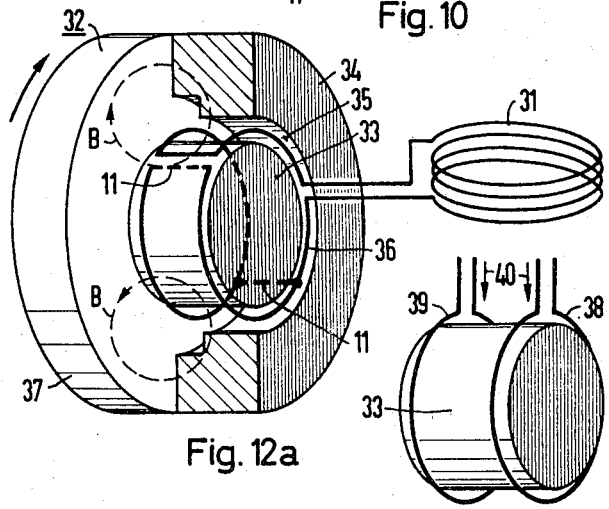
Fig. 12a
Fig. 12b
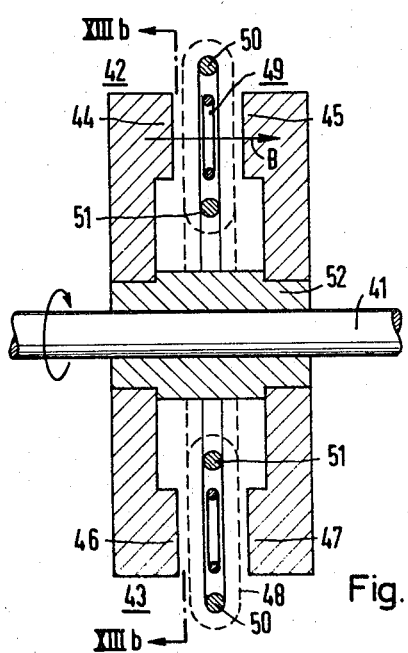
Fig. 13a
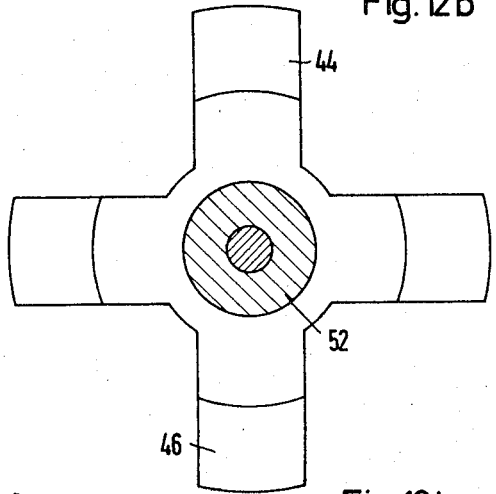
Fig. 13b

United States Patent Office 3,441,755
Patented Apr. 29, 1969

3,441,755
DIRECT-CURRENT MACHINE
Erich Grünwald, Erlangen, and Wilhelm Kafka, Tennenlohe, Germany, assignors to Siemens Aktiengesellschaft, Berlin-Siemensstadt, Germany, a corporation of Germany
Filed Dec. 20, 1965, Ser. No. 515,105
Claims priority, application Germany, Dec. 18, 1964, S 94,680
Int. Cl. H02k 3/00, 23/26, 27/02
U.S. Cl. 310—10                              9 Claims

ABSTRACT OF THE DISCLOSURE

A direct current machine having a superconducting armature winding which has a plurality of sections includes a commutating arrangement which comprises apparatus for providing an operating magnetic field which is applied to the sections to cause a transition in the sections from the superconducting to the normally conducting state. Commutating poles provide a field through which the sections are passed to render them current-free. The sections are caused to alternate between the states by relative motion between the magnetic field and the sections to pass the sections through the magnetic field.

---

Our invention relates to DC machines. More particularly, it relates to improved DC machines embodying superconducting armature coils.

At present, there exists a need for generators having superconducting armature windings to supply loads such as superconducting field windings, transmission lines of superconducting material and the like. Such generators present the advantage that points between superconductors and normal conductors may be omitted. In addition, they present the additional advantage in that considerably higher energies may be handled in a smaller space as compared to armature windings comprising normal conductors.

It has been found that in the operation of direct current machines comprising superconducting armature windings, the commutation therein presents the greatest difficulties. This is because there occurs the production of local heat between a superconducting collector and a superconducting brush, such heat being the result of the transition resistance, and being very difficult to dissipate at the temperature involved. By contrast, the stress or pressing effect cannot be raised sufficiently or adequately to increase the transition resistance to an adequate value since large extensive friction imposes a limit on such transition resistance increase.

It is, accordingly, an important object of this invention to solve the aforesaid commutation problems encountered in direct current machines having superconducting armature windings.

This object is attained by effecting commutation in such machines in a manner entirely different from known techniques. According to the invention, sections of a superconducting armature winding are alternately led as connecting paths from a superconducting to a normally conducting state through an operating magnetic field which is movable relative thereto. With such arrangement, the commutating is effected in the winding coils.

In known superconducting material magnetic flux pumps, no commutation operation is carried out therein and, consequently, such devices produce only unipolar current pulses, but almost no smooth unidirectional current. In addition, in many cases, the magnetic fields in the operating magnets therein have to be constantly varied for their operation in a predetermined manner whereby no high velocity machines can be constructed in accordance with this operating principle. Such operating principle is described immediately hereinbelow.

An inductance free magnetic field is provided in a band shaped high inductance armature coil turn, by converting the conductor section from the superconducting to the normally conducting state using a pump magnet. The field of the pump magnet is changed in the turn and a voltage or a current which produces a magnetic field is induced in this pump phase. A magnetic field which gradually attains a threshold value is produced after several pump phases as a consequence of the current circulating in the armature being pumped to an increasingly higher value. If it is desired to use superconducting wires rather than the relatively broad superconducting bands or tapes, then it is required that an additional current path be provided in order that the coil current not be interrupted during a local transition of a conductor section. The use of superconducting wires instead of bands or tapes exists in another known type of magnetic flux pump.

Another current source is also known which is operated without commutating. Such source consists of a thin, round, superconducting lead disc and a field coil which is perpendicularly disposed between brackets which are attached between its center and rim. A magnetic pole rotates under the lead disc and is chosen to have a field strength such that a plate spot which rotates with the magnetic pole enters the transition state. The inducing of a current flowing in the field coil has to be produced in a manner such that the flux through a normally conducting opening in the lead plate and flux through the opening constituted by the field coil, connecting brackets and feet connecting line become intertwined with one another at the lead plate formed opening whereby each flux remains unvarying. With such arrangement, a current should be induced which produces a correspondingly unvarying magnetic flux. Such results should also obtain where a type of flux pump is employed in which the number of rotations are to be limited in accordance with particular design specifications.

By contrast, according to the invention, there can be produced direct currents, that is, direct current voltages, on a large scale with respectively constant magnetic fields. If commutating poles are provided to render the connecting, that is, switching, paths free of current prior to their entering the operating magnetic field, then a commutation can be obtained which is substantially free of losses. The essential losses result from the fact that magnetic energy stored in the circuit is lost.

Generally speaking and in accordance with the invention, there is provided a commutating arrangement for a direct current machine having a superconducting armature winding having a plurality of sections comprising means for providing an operating magnetic field which is applied to the sections to cause a transition therein from the superconducting to the normally conducting state. Relative motion between the field and the sections whereby the sections are passed through the field causes the sections to alternate between the aforesaid states.

Also, in accordance with the invention, there is provided a method of commutating a direct current machine having a superconducting armature coil comprising a plurality of sections which comprises passing the sections as switching paths through an operating magnetic field which is moving relative thereto to cause said paths to alternate between the superconducting and normally conducting state.

For a better understanding of our invention together with other and further objects thereof, reference is had to the following description of a direct current machine having a superconducting armature coil according to our invention shown by way of example in the accompanying drawings, wherein:

FIG. 1b is a schematic diagram similar to that of FIG. 1a of a variation of the embodiment of FIG. 1a;

FIG. 3 is a view similar to that of FIG. 1a and shows a variation of the arrangement of FIG. 1a;

FIGS. 7a, 7b, 7c and 7d are schematic views, partly in section, of respective stages of operation of still another embodiment of the arrangement of the invention;

FIG. 8 is a schematic diagram, partly in section of an arrangement comprising the embodiment of FIGS. 7a to 7d;

FIG. 9 is a schematic diagram, partly in section, of a variation of the embodiment of FIGS. 7a to 7d;

FIG. 10 is a schematic diagram of an arrangement including the embodiments of FIGS. 7a to 7d or FIG. 8;

FIG. 11 is a detailed cross-sectional view of a portion of a connecting or switching path of the arrangement of FIG. 10;

FIGS. 12a and 12b are three-dimensional views, partly in section and partly cut away, of a direct current machine constructed in accordance with the principles of the invention;

FIG. 13a is a cross-sectional view of another example of a direct current machine embodying the arrangement of the invention;

FIG. 13b is a view taken along the lines XIIIb—XIIIb of FIG. 13a, looking in the direction of the arrows;

FIG. 16 is a schematic illustration of an arrangement of a coil group of FIG. 2a;

Figure 1A:
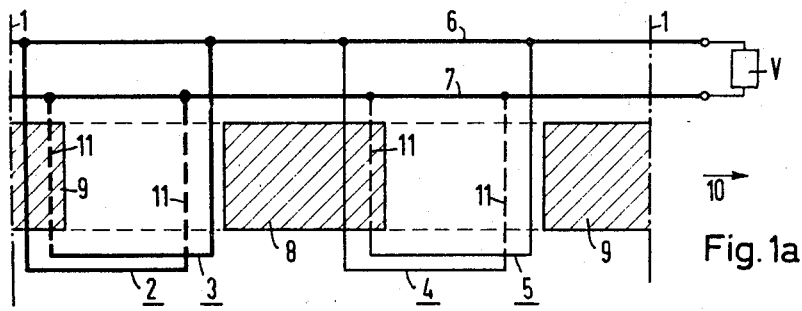
FIG. 1a is a schematic diagram, partly in section, of an illustrative embodiment of the arrangement of the invention.

Referring now to FIG. 1a, wherein there is illustrated a cylindrical armature coil, it is convenient for illustrative purposes to consider that the coil has been sectioned at broken line 1. Coils 2 and 3, and coils 4 and 5 may be considered as forming respective different groups. Actually the two coils forming a group are physically superimposed and are depicted as shown in FIG. 1a in the interests of greater clarity of exposition. This type of arrangement provides more spaces free of coil heads to render the machine more readily accessible.

The coils and groups of coils are electrically connected in parallel with each other and are connected to bus bars 6 and 7 for current collecting. The structures 8 and 9 are operating magnetic poles of like polarity. Poles 8 and 9 may be permanent magnets or electromagnets. If they are electromagnets, they may be provided in a cryostat with a coil having normal conductors or superconductors.

Normal conductors in a cryostat may also be employed to produce magnetic fields for the operating poles. The excitation coil may be self or separately excited and supplied with the produced current. Poles 8 and 9 can be considered to be moving below and relative to the armature coil in the direction of arrow 10.

The armature coil may be tightly received within a cryostat. Compared to a moving armature coil, the advantage presented by stationary operating poles is that no contact problems occur in connection with the current load devices. Each coil of the armature winding has a connection path or switching path, as depicted by the broken lines 11. These paths comprise a superconducting material whose critical field strength is less than the field strength of the operation magnetic poles which are utilized. Their critical strength has to be chosen to be sufficiently great that no transition occurs due to armature currents, even in cases of the greatest stress. During the passage of the operating magnetic poles, the sections of the armature winding developed as connecting paths, are converted alternately back and forth from the superconducting to the normally conducting state.

Paths 11 may consist of superconductors such as, for example, lead or niobium, or alloys such as lead-bismuth, niobium-tantalum, or molybdenum-rhenium. In paths 11, the superconductors are preferably employed as thin layers of less than $10^{-5}$ cm. thickness in order to increase their ohmic resistance in the normally conducting state through the effect of the path length. The remaining sides of the coils of the armature winding consist of such hard superconductors that they remain superconducting even when subjected to the magnetic field of the operating poles. These sides may be wires or bands of an alloy such as niobium-zirconium or titanium-niobium, or of an intermetallic compound, such as niobium-tin ($Nb_3Sn$) or vanadium-gallium ($V_3Ga$), for example. The critical current density of a hard superconductor such as niobium-zirconium is approximately $10^5$ A./cm.$^2$ at a field strength of 20 kilograms. Thus, where such alloy is employed for its stated purpose as detailed hereinabove, the magnitude of the armature current has to be below this value.

In the coil groups comprising coils 2 and 3, and coils 4 and 5 respectively, paths 11 are on alternate coil sides and the coils are also alternately connected to bus bars 6 and 7. Such group produces two adjacent voltage pulses. A coil side length is not greater than the width of a pole surface in the direction of pole movement. The coil groups are uniformly distributed over the periphery, spaced one coil width, and a number of operating working magnetic poles is provided such that one longitudinal side of the coil transverse to the direction of movement is always present in the operating magnetic field. In the embodiment shown in FIG. 1a, the armature coils extend over half of a pole division. It is preferable that the coil length be at least as great as the length of the operating poles transverse to the movement. If the coils were selected to be wider than the width of the poles, a short circuit would always occur for a load. By contrast, if the width of the coils were chosen to be less than the width of a pole, then the width of the pole would not be fully availed of. The pairs of voltage pulses produced by the individual coil groups link with one another. Several coil groups which are partially superimposed may be utilized.

Thus, for example, if the operating poles move past the coil groups from left to right, as seen in FIG. 1a, a voltage is induced in the left coil sides of coils 2 and 4 which drives a load current through a connected load V. At the same time, the respective left connecting paths 11 in FIG. 1a enter the normal conducting state, that is, they undergo transition in response to the action of the operating magnetic field. This causes these left paths 11 to have an ohmic resistance which is so high that the voltages induced therein do not produce a necessary amount of current. In the arrangement shown in FIG. 1a, this latter current would constitute a current which would flow in the direction opposite to the flow direction of the operating current. When the operating poles in their movement reach the right longitudinal sides of the coils of the respective groups, an operating voltage of like polarity is induced in coils 3 and 5 between bus bars 6 and 7 because of the alternate connection as described hereinabove. At this time the left coil sides 11 of these coils are again in the superconducting state. The right coil sides 11, functioning as connection or switching paths, produce a relatively small current due to their high resistance. As a result of this action, the operating current in the second half wave of current is commutated in each coil.

A salient advantage of the direct current machines according to the invention is that the commutating losses therein are precisely and simply occasioned therein and may be minimized by constructive measures which can have a great bearing in the construction of like large industrial machines. Their watt capacity can be determined from the induced voltage, i.e., the voltage applied at the terminals and from the resistance of the connection path in its normally conductive state, as well as from the circuit inductance and the coil current.

Figure 1B:
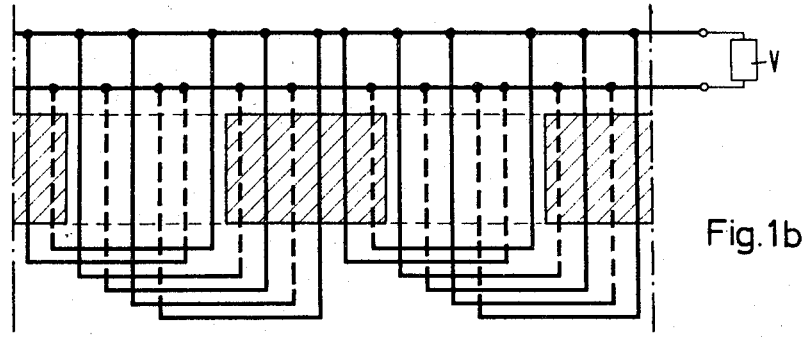

FIG. 1b shows a bus bar in which the coils are of the same width as those shown in FIG. 1a and in which there are employed the same contact reference symbols. However, instead of two pairs of conductors for each pole, as shown in FIG. 1a, the arrangement of FIG. 1b shows six double conductors for each pole. Thus, the operating voltage for each operating pole is induced in three coils, electrically connected in parallel arrangement.

If the armature winding consists of a single coil whose one longitudinal side or one section in the length of an operating pole is constructed as a connecting path, then a pulsating direct current is produced provided that one longitudinal coil side is always present in the magnetic field. The simplest direct current machine can therefore be constructed from a coil and an operating pole of like width, such width being one half of the periphery of the pole's movement path. A substantially continuous unidirectional current may be produced in a coil grouping as shown in FIG. 1a.

Figure 2A:
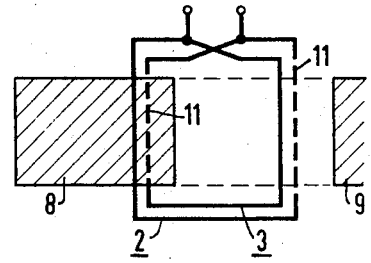
FIGS. 2a and 2b are schematic diagrams of respective different stages of operation of another embodiment of the arrangement of the invention.
Figure 2B:
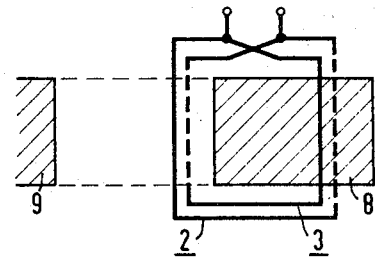

FIGS. 2a and 2b illustrate a direct current machine, according to the invention, for producing a continuous or uninterrupted direct current. These machines can also be started up in any position. FIG. 2a shows the position or state of the machine which obtains at a time $t$, for example, with the operating poles in a given relationship with the coils and FIG. 2b shows the position which obtains at a time $t+T$. It is thus seen from FIGS. 2a and 2b that time T constitutes the period relative to a coil.

Figure 3:
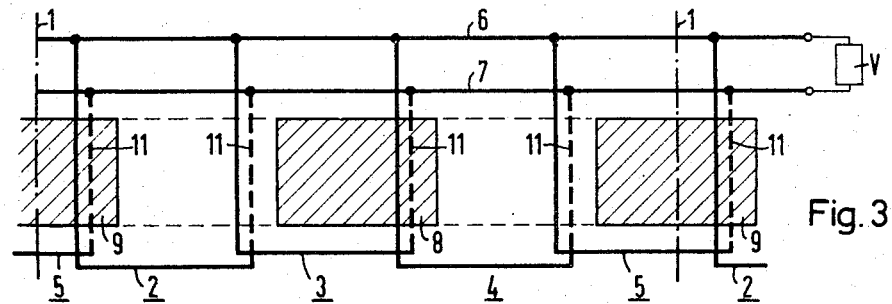

FIG. 3 shows an arrangement, according to the invention, which is a variation of the one shown in FIG. 1a. In the arrangement of FIG. 3, four coils 2, 3, 4 and 5 are uniformly distributed along the periphery and all are connected to bus bars 6 and 7 in the same manner. The current and voltage characteristics of the arrangement of FIG. 3 are the same as in FIG. 1a.

If the armature winding is formed from at least two coils connected in parallel, of which only the longitudinal side of a coil which is left free of the connection or switching is present in the magnetic field of the operating pole as is the case in the arrangements shown in FIGS. 1a–3, then there always remains one current path which is closed upon itself through the load and the armature coil with an induced operating voltage. Such phenomenon presents the great advantage that where the loads are inductive, the connecting or switching paths are bridged in the normally conducting state and are loaded with only a small fraction of the load current.

Figure 4:
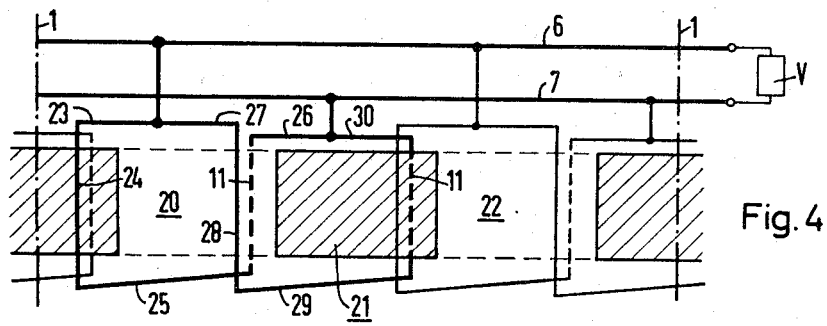
FIG. 4 is a similar showing to that of FIG. 3 and is a variation of the arrangement of FIG. 3.

FIG. 4 shows another construction of the armature coil, such arrangement being similar to that depicted in FIG. 3. In the arrangement shown in FIG. 4, two coils are electrically connected in parallel in the armature winding prior to their being connected to the bus bar, coils 20 and 21, for example, being such coils. Coil sides 23, 24, 25, 11 and 26 form coil 20 and coil 21 is formed from sides 27, 28, 29, 11 and 30.

Figure 5A:
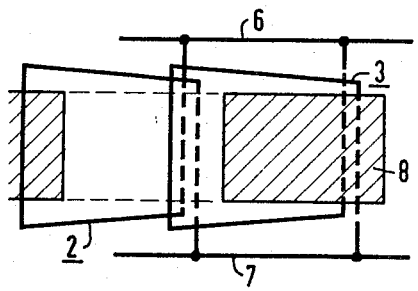
FIGS. 5a and 5b are schematic views, partly in section, of different stages of operation respectively of another embodiment of the arrangement of the invention.
Figure 5B:
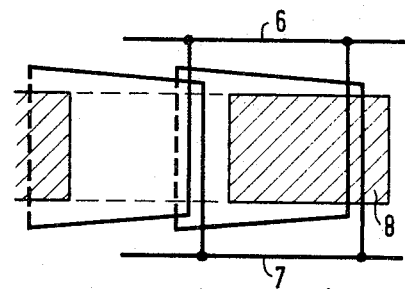

FIGS. 5a and 5b show another embodiment of an armature winding with two coils 2 and 3 for producing a continuous direct current. The bus bars 6 and 7 lie at opposite sides of the machine. In FIG. 5a, the coil side for the operating voltage is at the left side and in FIG. 5b it is at the right side. Here, the bus bars 6 and 7 may be utilized to reduce the reverse effect of the armature on the magnetic field.

Figure 6:
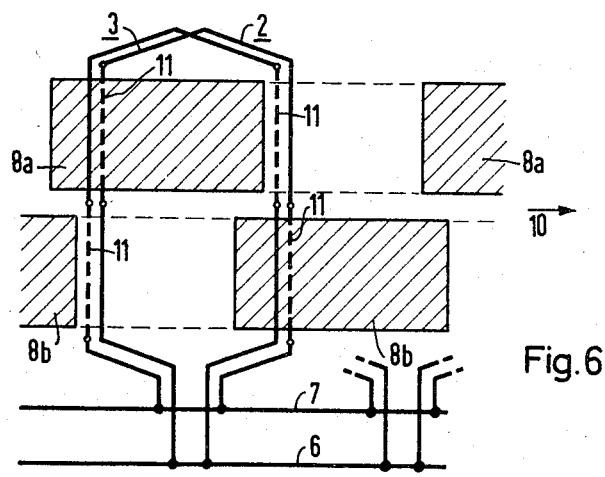
FIG. 6 is a schematic diagram, partly in section, of another embodiment of the arrangement of the invention.

In FIG. 6, there is shown a coil group from another armature winding.

The pressure of a second coil group is indicated only by its connections to the bus bars. Two rows of operating poles are employed on one side of the armature winding, a row 8a thereof having one magnetic polarity and a row 8b thereof having the opposite polarity. In the coil longitudinal sides of the operating poles, connection or switching paths 11 alternate transversely to the direction of the movement 10 of the operating poles and to the constantly superconducting sections from coil side to coil side in alternate disposition. With such arrangement, magnetic poles of opposite polarity within an armature coil induce in the same direction, one polarity when entering the coil and the opposite polarity when leaving the coil. Thus, the operating phases and the commutating phases are alternated from one polarity to the other polarity. If both magnetic pole types are disposed one side of the surface of the armature winding, then the magnetic return path is rendered easier since such path does not have to be passed about the exterior of the armature winding. On the other side of the armature winding, the poles of the respective opposite polarities are disposed in a row of poles. The magnetic flux traverses the region of the armature winding only to effect energy conversion.

In the embodiment of the armature winding shown in FIGS. 7a to 7d, coils 2 and 3 are combined into one interconnected double coil 12 with the connecting path 11 displaced approximately one pole width. The double coil may be considered to be arranged such that two coils are combined whereby they exhibit one common and one non-common connecting or switching path. The operating voltage is induced in the constantly superconducting coil longitudinal side 13 while the other two coil sides with connecting or switching paths 11 function for commutating purposes. At the same time, the superconducting switching path which is not at the moment disposed within the magnetic field, forms a bridge for the operating current. If a double coil such as shown in FIGS. 7a to 7d is employed, then a single such double coil, requiring less material for its makeup than two separate coils is adequate to continuously maintain a well conducting closed circuit operating current through the load.

In the double coil arrangement of FIGS. 7a to 7d, the operating poles 8 are specifically illustrated as having the same polarity. If such working poles are considerd as being constructed in the form of a gear array and double coil 12 as being energized, then there results a linear motor. The mode of operation of an armature winding will be shown in a figure of a machine with rotating armature poles which is employed in the operation of generators. In such figure, the operating poles can also be considered unwound in the plane of the drawing.

FIGS. 7a to 7d illustrate the respective positions of operating poles 8 for double coil 12 at time points $t=0$, $t$, $T_2$ and $(t+T/2)$. The load for double coil 12 is depicted as the inductance L and the ohmic resistance R.

Thus, in FIG. 7b, an operating pole enters into double coil 12 from the left and another leaves the coil at the right. If these poles passed under the double coil are South magnetic poles, for example, a voltage is induced in coil side 13 which is proportional to the inductance and speed of motion and which produces a current in the left coil which flows in the counterclockwise direction.

The right connecting or switching path 11 is normally conducting and imparts a high resistance to the coil path.

In FIG. 7c, the operating current has attained its highest value. Since the right connecting path 11 in this situation is again superconducting, the operating current can branch off through the center and right outer connecting paths.

In the situation depicted in FIG. 7d, the center connecting path 11 is normally conducting and the operating current is diverted to the outer coil side of the double coil. The operating current has thus been commutated from the center connecting path to the outer connecting path. In the situation depicted in FIG. 7a, both connecting paths are superconductive and able to participate in the conveying of current. In the position of the operating pole shown in FIG. 7a, the operating current is finally commutated back from the right connecting path to the center converting path.

FIG. 8 also illustrates the uncoiling of an armature winding into a row of parallel connected double coils. Double coils 12 and 14, and 15 and 16 respectively are connected in series and form a strand. These strands of rows of double coils 12 and 14, and 15 and 16 respectively are parallel connected to bus bars 6 and 7. The arrangement illustrated in FIG. 8 has two distinct operating poles, the operating pole 9 is shown as being partly cut away. Pole division is understood to mean the portion of an armature winding length which is associated with an operating pole. It is then understood that each coil of the double coils between the coil length sides has the width of a pole area in the direction of movement. Instead of displacing the connecting paths by one half of a pole division, they may also be displaced by an odd-numbered multiple of one half of a pole division.

Another embodiment of double coils is shown in FIG. 9. In this embodiment, one connecting path lies under the continuously superconducting longitudinal side 13. The other connecting path 11 may be derived as a common connecting or switching path for coils 2 and 3. The mode of operation of the embodiment shown in FIG. 9 corresponds to that described in connection with FIGS. 7a to 7d.

FIG. 10 schematically shows an embodiment of a double coil arrangement in accordance with those shown in FIGS. 7a to 7d and 8 in which higher voltages may be produced by the use of an increased number of windings. In such arrangement, switching or connecting paths 11 have to have a higher resistance in their normally conducting state. If the switching paths are made from meandering or staggered wires or thin tapes, then a high resistance therefor is provided during the normally conducting state of the connecting path with practically no increase of inductance whereby such type of switching or connecting path exhibits particularly low losses. In staggered or meandering positions, the induced voltages cancel each other out. This principle of construction may also be employed to great advantage in the other previously hereinabove described armature windings. The resistance of such switching or connecting paths may be still further increased if superconducting layers are used which are less than 1000 A., since boundary effects would occur. For producing high currents, several of the latter superconducting layers may be connected in parallel. In addition, a material may be used which is of particularly high ohmic resistance in the normally conducting state.

FIG. 11 is intended to show a portion of a switching or connecting path as used in the arrangement shown in FIG. 10. In order to avoid the production of eddy currents, the meandering or staggered layers are disposed along the direction of magnetic induction B and perpendicularly to the direction of movement 10. Such connecting or switching path, comprising a plurality of reciprocally positioned back and forth lines of a superconducting layer 18, may be constructed such that the superconducting layers, which may be niobium, for example, are respectively disposed between carrier layers 17 and insulating layers 19. Thus, for example, a superconducting layer 18 of niobium having a thickness of one micron may be disposed between synthetic material layers 19 having a thickness of about twenty microns and between copper carrier foils 17 having a thickness of approximately 50 microns. The synthetic material may suitably be "Hostaphan." Aluminum tape which has been oxidized at its surface may be utilized as the carrier. A superconducting layer of lead of approximately 0.1 micron thickness may be deposited thereon.

FIG. 12a shows a quite simple embodiment of a direct current machine which supplies substantially direct current for high inductance loads. In such machine, the magnetic field of a field coil 31 may consequently be built up to a saturation value. The machine comprises an axially rotatable cup magnet 32, an annular gap 35 being formed between a centrally disposed structure 33 and a marginal protrusion 34, which in this case forms a single operating pole. The armature winding 36, comprising a superconducting material, extends over a cylindrical area and is disposed concentrically with the axis of the cup magnet and is received in annular gap 35. The armature winding which is shown herein is constructed as a single double coil and may be contained in a circular cryostat (not shown). The magnetic field of induction B has a return path between protrusion 34 and structure 33.

Cup magnet 34 may be of the permanent magnet type or the magnetic field may be produced from a circular excitation winding (not shown). To this end, as shown in FIG. 12b, two annular coils 38 and 39 may be provided around central structure 33, near the base of plate 37 and near the front foil of central structure 33. As indicated by arrows 40, the coils are to be energized in the respectively opposite senses. The aforementioned excitation windings may comprise superconductors and may be contained in the same cryostat as that containing the armature winding.

An embodiment of a direct current machine according to the invention is shown in FIGS. 13a and 13b. FIG. 13a is a view of a section through rotational axis 41. The machine comprises a flat ring-shaped cryostat 48 in which there are arranged an armature winding 49 and a double ring-shaped excitation winding having annular conductors 50 and 51. The excitation winding, for example, is energized such that a magnetic induction B has a return path between the operating poles 42 and 43 through a hub 52. The operating poles are formed by clawlike arms 44 and 45, and 46 and 47 respectively whereby a return path is effected through a cylindrical hub, as in a horseshoe magnet. The armature winding 49 which is disposed in the annular space may be constructed as one of the armature windings previously described hereinabove.

FIG. 13b is a view of the machine shown in FIG. 13a taken along line XIIIb—XIIIb. It is to be realized that although the embodiment shown in FIG. 13b has four operating poles, in accordance with the invention, any desired appropriate number of poles may be employed.

To achieve a substantially loss-free commutation, commutating poles may be moved ahead of the operating poles along a path within the longitudinal sides and outside of the connecting or switching paths. To illustrate such commutating arrangement, reference is made hereinbelow to types of windings previously described.

FIGS. 14a to 14g are schematic diagrams of a double coil as shown in FIGS. 7a and 7d and utilized in a device such as shown in FIG. 12a. Such coil should be driven by a single operating pole. Adjacent to the path of movement in direction 10 of operating pole 8 is a commutating pole 53 which is conveyed ahead of the operating pole. The width and length of the operating pole, constructed as shown in FIGS. 7a to 7d are shortened by amounts equal to the corresponding dimensions of the commutating pole. Accordingly, the commutating pole is preferably selected to be as small as possible. There are no switching or connecting paths in the path of the commutating pole. The superconducting longitudinal coil sides 13, 54 and 55 lie along the path of the operating pole. An inductive and resistive load are designated with the notations L and R. The armature winding is again shown unwound and poles 8 and 53, moved in direction 10, are disposed behind the armature coil. The operating and commutating poles are chosen to be South poles, for example.

Figure 14A:
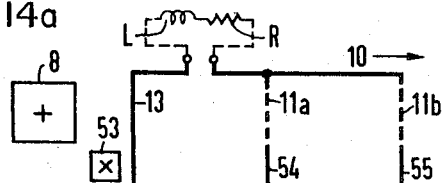
FIGS. 14a to 14g are schematic views of various stages of operation of another embodiment of the arrangement of the invention.
Figure 14B:
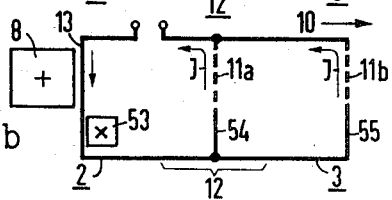

In considering the startup operation of the direct current machine which operates as a generator, the operating phase commences as shown in FIG. 14b wherein there is induced a current I which flows downwardly in side 13 and flows upwardly, distributed in sides 54 and 55. Commutating pole 53 is traversed by a current which is related to the operating current. The proportion ratio is adjusted such that the field of the commutating pole is a voltage time integral in the coil sides 54 which is capable of deflecting the current to section 55 despite the inductance of the turn.

Figure 14C:
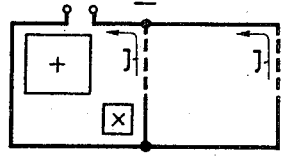
Figure 14D:
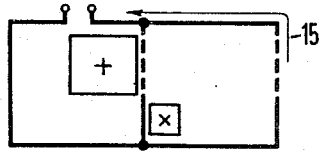

In the situation shown in FIG. 14c, the commutating pole begins to induce a countervoltage in the center coil side and deflects the current to the outer coil sides, the latter situation being shown in FIG. 14d. Then the operating pole converts the current-free connecting path 11a to the normally conducting state. Because of the current-free switching or commutating, there remains the energy which is stored as the magnetic field.

Figure 14E:
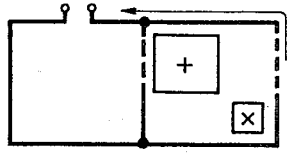
Figure 14F:
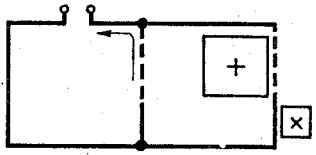
Figure 14G:
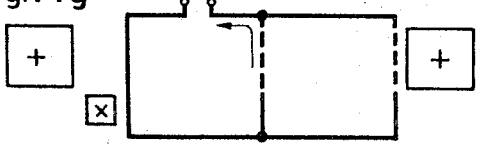

In FIGS. 14e and 14f, it is seen that the current which is still flowing because of the load inductance is diverted back to the center coil side. The transition in path 55, caused by the movement thereby of the operating pole, again occurs during a current-free condition of the right coil side. The situation shown in FIG. 14g is followed by that of FIG. 14a. The commutating pole functions in the inducing of an operating voltage, depending upon the intensity of the armature current.

Figure 15:
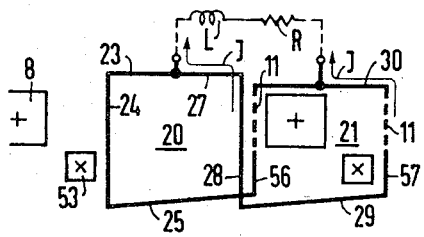
FIG. 15 is a schematic diagram of a variation of the embodiment of FIG. 4.

In the armature winding shown in FIG. 15, essentially as that shown in FIG. 4, a load current is passed from coil 20 to coil 21 and then deflected. Coil 20 is formed by sides 23, 24, 25, 5b, 11 and 26 and coil 21 is formed by sides 27, 28, 29, 57, 11 and 30.

Figure 16:
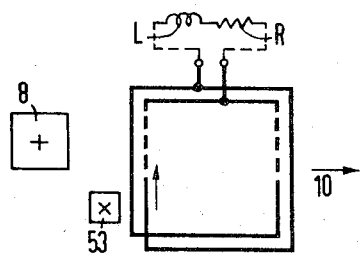

FIG. 16 is a schematic depiction of a coil group constructed in accordance with the arrangement shown in FIG. 2a to provide loss-free commutating with commutating poles.

Figure 17:
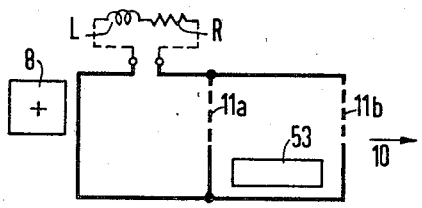
FIG. 17 is a schematic diagram of another variation of the embodiment of FIGS. 14a to 14g.

FIG. 17 is an illustration of another embodiment of double coils in which there is a stationary arrangement of commutating poles between coils with two connecting or switching paths. They are then excited by an alternating current voltage which is approximately proportional to the load current. The fundamental frequency of this alternating current voltage corresponds precisely to the period determined by pole spacing and the rate of pole movement. However, the excitation voltage which is applied should not have a sinusoidal waveform, but should eventually have a rectangular form with a duration between voltage pulses which corresponds to the period in which an operating pole crosses a connecting or switching path. This type of voltage produces an approximately trapezoidal shaped commutating pole flow in the winding formed by the two connecting or switching paths.

The mode of operation is as follows. Before the operating pole 8 passes over the center coil side containing switching path 11a, the commutating pole is to be excited by a first current, relative to the armature current, such that said commutating pole has the same polarity as the armature pole. This excitation is maintained until such time as the operating pole has left switching path 11a. Before the commutating pole reaches path 11b to place it in the transition state, the commutating pole is excited in the opposite direction by a second current equal in strength to the aforementioned first current.

Figure 19:
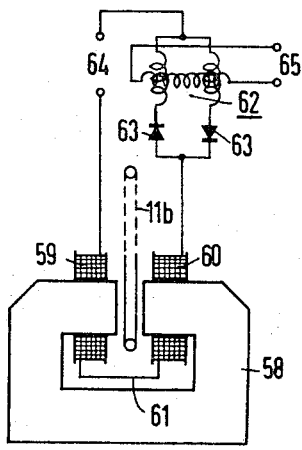
FIG. 19 is a schematic diagram of an arrangement for controlling a commutating pole according to the invention.

The construction and control of a commutating pole shown in FIGURE 17 is illustrated in FIG. 19. For providing a convenient orientation, there are depicted in FIG. 19 the stationary coil side and switching path 11b the way they would appear if they were to be viewed in the direction of the movement of the operating pole. The commutating pole 53 shown in FIG. 17, which is also stationary, may suitably be a pole of a horseshoe magnet 58. A transducer 62 is provided in the energizing line 61 for windings 59 and 60, transducer 62 having two branching operating paths with a pair of series connected rectifier diodes 63 connected in antiparallel to the latter paths, that is, in a voltage controlled antiparallel connection. The energizing terminals 64 are supplied with an alternating current voltage such as described hereinabove in connection with the operation of the arrangement shown in FIG. 17, such voltage having a time period which is dependent upon the pole distribution and the rate of movement. The voltage time area occurring at the commutating pole winding is made proportional to the direct current by the control action of the transducer, such control being a width control. The control current is coupled to the armature winding by a direct current transformer.

Figures 18A, 18B:
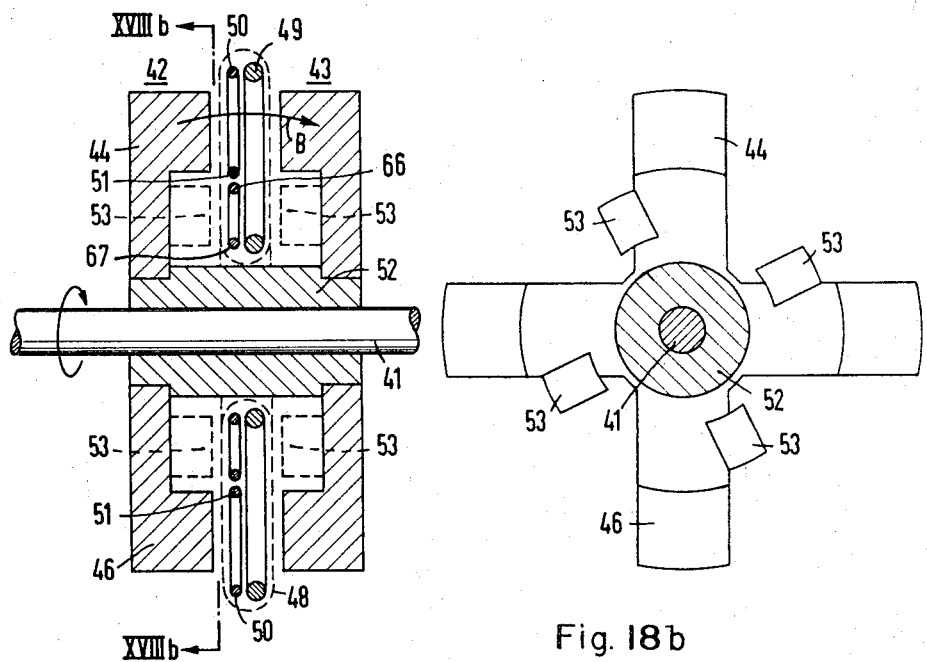
FIG. 18a is a cross-sectional view of another embodiment of a direct current machine constructed in accordance with the invention.
FIG. 18b is a view taken along the lines XVIIIb—XVIIIb of FIG. 18a, looking in the direction of the arrows.

Mechanically rotating commutating poles for a machine according to FIGS. 13a and 13b may be easily produced by substituting the pole wheel shown in FIG. 18b for the one shown in FIG. 13b. The magnetic field can then again be produced via a magnetic return path between four ring conductors.

In the embodiment shown in FIGS. 18a and 18b, the operating magnetic field is produced by the two ring conductors 50 and 51. The ring conductors 66 and 67 produce a reversing pole field which is concentrated between the poles 53. The armature has an armature winding 49.

The useful direct current of the described direct current machine is limited by the actual current of the hard superconductors and the connecting or switching paths, the dimensioning of the commutating poles and the reverse effect of the armature. It is preferable to bring the various limits to approximately the same value by appropriate dimensioning.

In order to be able to use the described direct current machines with commutating poles in a motor operation, all that is required is the impressing of a current of a technically positive direction from the positive to the negative terminals between the contact terminals of the armature winding and also to reverse the polarity of the excitation winding for the commutating poles. Thus, there is obtained a motor having the same direction, of course, as described hereinabove in connection with the operation of a generator.

It will be obvious to those skilled in the art upon studying this disclosure that direct current machines according to our invention permit of a great variety of modifications and hence can be given embodiments other than those particularly illustrated herein without departing from the essential features of our invention and within the scope of the claims annexed hereto.

We claim:
1. A commutating arrangement for a direct current machine having a superconducting armature winding having a plurality of sections, said arrangement comprising
    field means for providing an operating magnetic field which is applied to said sections to cause a transition in said sections from the superconducting to the normally conducting state; and
    commutating pole means through whose field said sections are passed to render them current-free, said sections being caused to alternate between said states by relative motion between said magetic field and said sections to pass said sections through said magnetic field.

2. A commutating arrangement for a direct current machine as defined in claim 1 wherein said field means comprises a plurality of rotating operating magnet poles of like magnetic polarity, wherein said armature winding comprises at least one coil whose width portion in the direction of said relative motion is substantially as great as the width of a surface of one of said poles, said coil width portion being operative as a connecting path which undergoes transition from the superconducting to the normally conducting state as it is passed through the path of movement of said magnetic poles, said poles being spaced such that at least one longitudinal side of an armature coil is always subject to said operating magnetic field.

3. A commutating arrangement for a direct current machine as defined in claim 2, wherein said armature winding comprises a pair of coils connected in parallel, at least one of said coils always being within the magnetic field of an operating pole, a longitudinal side of said one coil being free of said operating magnetic field movement path.

4. A commutating arrangement for a direct current machine as defined in claim 2, wherein said armature winding comprises at least two parallel connected coils which are displaced in phase relative to said operating magnetic field.

5. A commutating arrangement for a direct current machine as defined in claim 2 wherein said armature winding comprises a parallel arrangement of series connected coils constituting strands and wherein equal coil sections within a strand are disposed in a like position relative to an operating magnetic pole.

6. A commutating arrangement for a direct current machine as defined in claim 2, wherein each of said coils is constructed as a double coil, each of said double coils comprising two parallel connected switching paths which are passed through said operating magnetic field, said paths being spaced from each other a distance substantially equal to an operating magnetic pole width.

7. A commutating arrangement for a direct current machine as defined in claim 2, wherein each of said coils comprises longitudinal sides comprising respective superconducting and switching sides in alternate disposition and wherein on each side of the armature winding there are disposed respective rows of operating magnetic poles of opposite magnetic polarity.

8. A commutating arrangement for a direct current machine as defined in claim 1, wherein portions of some of said paths are operative to be switched from the superconducting to the normally conducting state, said commutating poles being so disposed whereby in the path of said relative motion they pass over said sections but outside of said portions.

9. A commutating arrangement for a direct current machine as defined in claim 6, wherein a double coil comprises two sections, each comprising portions which are capable of being switched from the superconducting to the normally conducting state and non-switching portions, and further including a stationary commutating magnetic pole disposed between said non-switching portions whereby upon the entering of one of said switching portions into an operating magnetic field said commutating pole is excited to cause a commutation to the other of said switching portions.

References Cited

Electrical Review, Jan. 3, 1964, p. 22.

DAVID X. SLINEY, *Primary Examiner.*

U.S. Cl. X.R.

310—198, 40